United States Patent [19]

Gustafsson et al.

[11] 4,016,737

[45] Apr. 12, 1977

[54] HIGH PRESSURE PRESS

[75] Inventors: Sven-Góran Gustafsson; Hans Gunnar Larsson; Kjell Lilja, all of Vasteras; Bertil Lundback; Jan Nilsson, both of Robertsfors; Pertti Syvakari, Helsingborg, all of Sweden

[73] Assignee: Allmanna Svenska Elektriska Aktiebolaget, Vasteras, Sweden

[22] Filed: Dec. 11, 1975

[21] Appl. No.: 639,830

[30] Foreign Application Priority Data

Dec. 6, 1974 Sweden .............................. 7415296

[52] U.S. Cl. .............................. 72/60; 72/DIG. 31; 72/272
[51] Int. Cl.² .......................................... B21D 22/10
[58] Field of Search ................. 72/272, 63, 60, 56, 72/DIG. 31; 277/188 R, 188 A, 58

[56] References Cited

UNITED STATES PATENTS

| 3,126,096 | 3/1964 | Gerard ........................ 72/DIG. 31 |
| 3,392,562 | 7/1968 | Fuchs, Jr. .............................. 72/60 |
| 3,707,864 | 1/1973 | Pigett et al. ........................ 72/272 |
| 3,914,981 | 10/1975 | Nilsson et al. .......................... 72/60 |
| 3,934,442 | 1/1976 | Larker et al. ................. 72/DIG. 31 |

FOREIGN PATENTS OR APPLICATIONS 1,170,931 11/1969 United Kingdom .................... 72/60

Primary Examiner—Leon Gilden
Attorney, Agent, or Firm—Watson, Cole, Grindle & Watson

[57] ABSTRACT

A press for hydrostatic extrusion includes a pressure chamber for enclosing a pressure medium which is formed of a high pressure cylinder, a pressure generating piston, a die and a die support and seals. The die support includes an exchangeable support ring which engages the end surface of the liner and bridges the gap between the liner and the die. A metallic sealing ring is arranged within the liner in engagement therewith, forming a gap between the inner surface of the sealing ring and the outer surface of the die or die support. The die support has a groove in its upper surface which contains a sealing member against which the edge of the metallic sealing ring engages. The lower outer corner of the metallic sealing ring is bevelled to form a space which communicates with the outside of the press.

3 Claims, 4 Drawing Figures

HIGH PRESSURE PRESS

BACKGROUND OF THE INVENTION

1. Field of the Invention

The invention relates to presses for hydrostatic extrusion with a die support and particularly to sealing such presses at the die end.

In presses for hydrostatic extrusion very high pressure levels are used; usually the working pressure is between 10 and 20 kbar. At this high pressure a reliable seal must be achieved between the inner wall of a press cylinder and a die or a die support and between the inner wall of the cylinder and a punch or a piston projecting into the cylinder, said punch or piston, when it is inserted into the cylinder, producing the high extrusion pressure in a pressure medium which is enclosed in a pressure chamber formed of the cylinder, the die and the piston. A billet to be extruded is located in the pressure chamber and is pressed out through the die under the effect of a pressure medium. On raising the pressure from atmospheric level the extrusion level, the inner diameter of the cylinder increases by 0.5 to 1%, which requires a seal to prevent pressure medium from flowing out through a gap between the cylindrical wall and the piston and the die, respectively, which expands upon a pressure increase. Any leakage at the high pressures mentioned may involve severe damage to the die or the die support, which requires an exchange of these expensive parts.

RELATED APPLICATIONS

Co-pending applications Ser. Nos. 633,842; 633,843 and 636,577 all relate to other parts of the present structure which contribute to the overall sealing effect.

2. The Prior Art

In U.S. Pat. No. 3,702,555 there is shown and described in more detail a press of the kind referred to in this invention. Larker application Ser. No. 462,402, filed Apr. 19, 1974 and U.S. Pat. Nos. 3,865,387 and 3,877,707 show different variations of high pressure seals for presses for hydrostatic extrusion, having a first sealing ring abutting the cylindrical wall and a seal holder and a second sealing ring sealing against a die or piston and a seal holder. These seals have provided a great improvement and have resulted in a great increase in the service life. However, certain drawbacks have remained. Particularly in the case of hot extrusion the metallic sealing ring, which seals against the die or die support and a seal holder, has not provided a satisfactory seal. In hot extrusion the die or die support are heated by the billet, which is heated up to 600° C, and are expanded so that the contact force against the surrounding sealing ring, which is not heated to the same extent, becomes very high. When removing the die or die support, cutting has occurred. Any scratches occurring have resulted in the fact that no sealing has been obtained during subsequent pressing.

To eliminate these problems, proposals have been made to use a die support which bridges the gap between the die and the liner of the press chamber cylinder, and which is pressed against the liner, and to use only one single metallic sealing ring. This ring abuts the liner with its outer cylinrical surface and the die support with one of its plane end surfaces. The die abuts a substantially plane support surface of the die support in a sealing manner. An elastomeric sealing ring for achieving initial sealing between the end surface of the metallic sealing ring and the support for the sealing ring cannot be applied in the manner known previously.

SUMMARY OF THE INVENTION

According to the invention, the die support is formed with an annular groove in which there is inserted a sealing ring which seals against said metallic sealing ring which in turn seals against the liner of the pressure cylinder. The sealing ring suitably consists of elastic material. The groove has an external diameter which is approximately the same as the liner diameter of the sealing ring. When the pressure chamber is then closed, the corner between the inner cylindrical surface of the metallic sealing ring and its outer end surface is pressed against the elastomeric ring in the groove, thus obtaining an initial seal between the die support and the metallic sealing ring.

By means of the invention, the advantage is gained that the elastomeric sealing ring is affected by the heat from a heated billet to a smaller extent than in previous seal constructions. In these previous constructions, the seal was exposed to heat radiation from the billet during almost the whole closing operation. Further, the elastomeric seal was built in so that it was difficult to inspect and replace it. In the construction according to the invention, the elastomeric seal is not exposed to heat radiation when the pressure chamber is closed, and it may easily be inspected and may be rapidly exchanged when damaged. Serious damage caused by leaking pressure medium can be prevented. The capacity of the press is increased and the operating costs are reduced.

BRIEF DESCRIPTION OF THE DRAWINGS

The invention is described in more detail with reference to the accompanying drawing.

DESCRIPTION OF THE PREFERRED EMBODIMENTS

Figure 1:
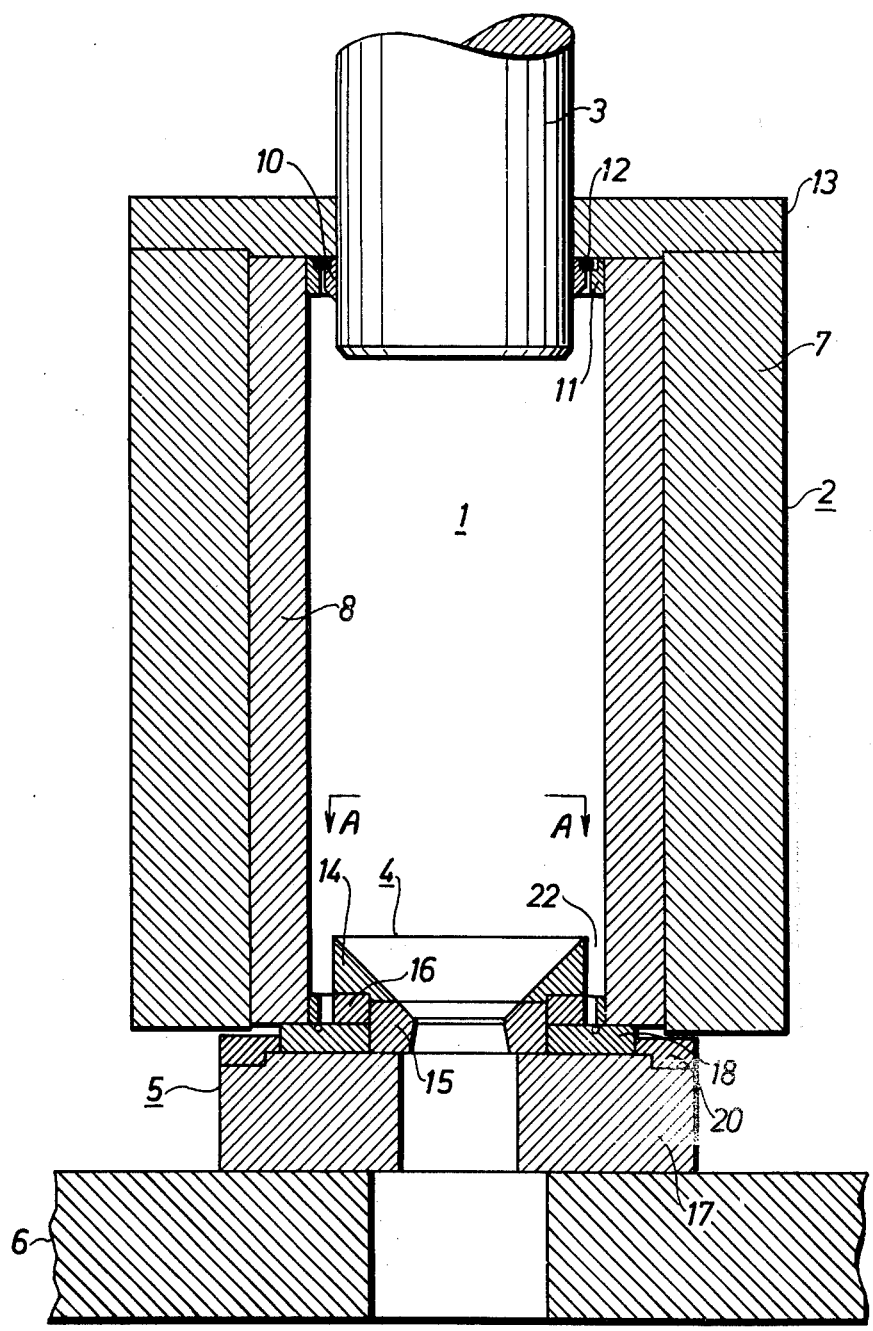
FIG. 1 shows schematically a pressure chamber in a hydraulic extrusion press.
Figure 2:
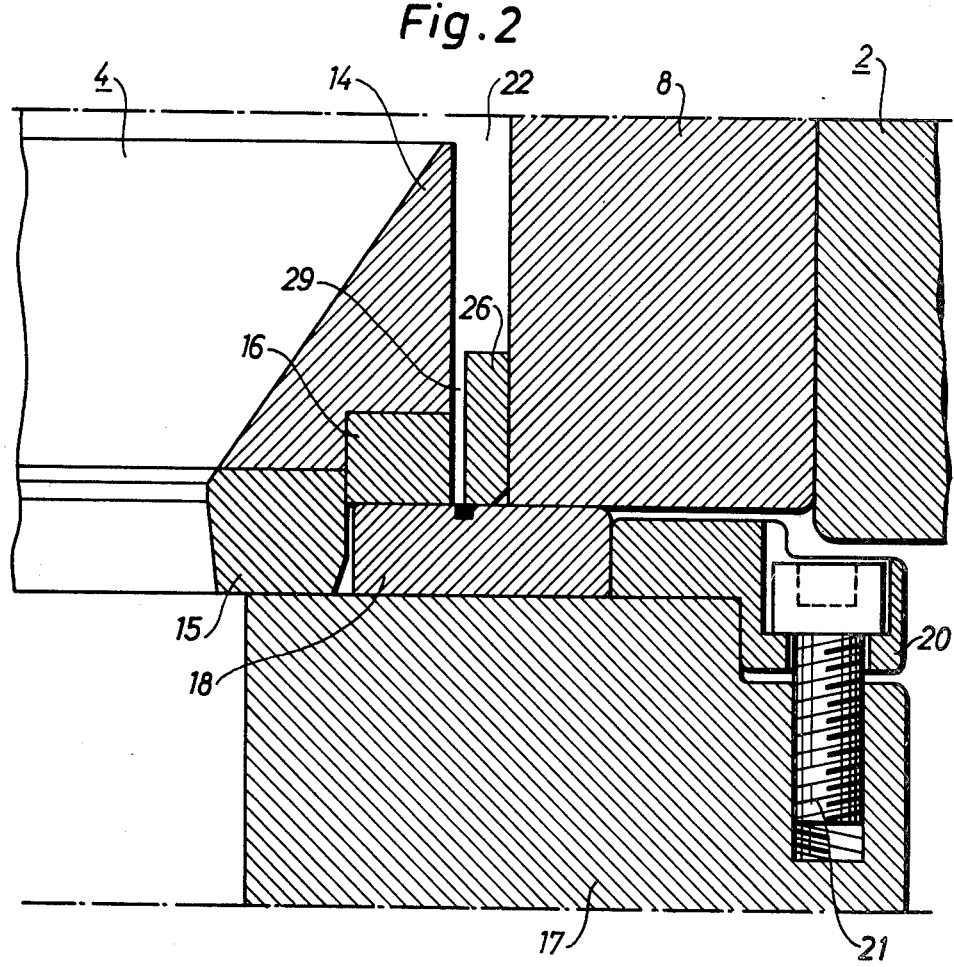
FIG. 2 shows on a larger scale the encircled portion in FIG. 1.
Figure 3:
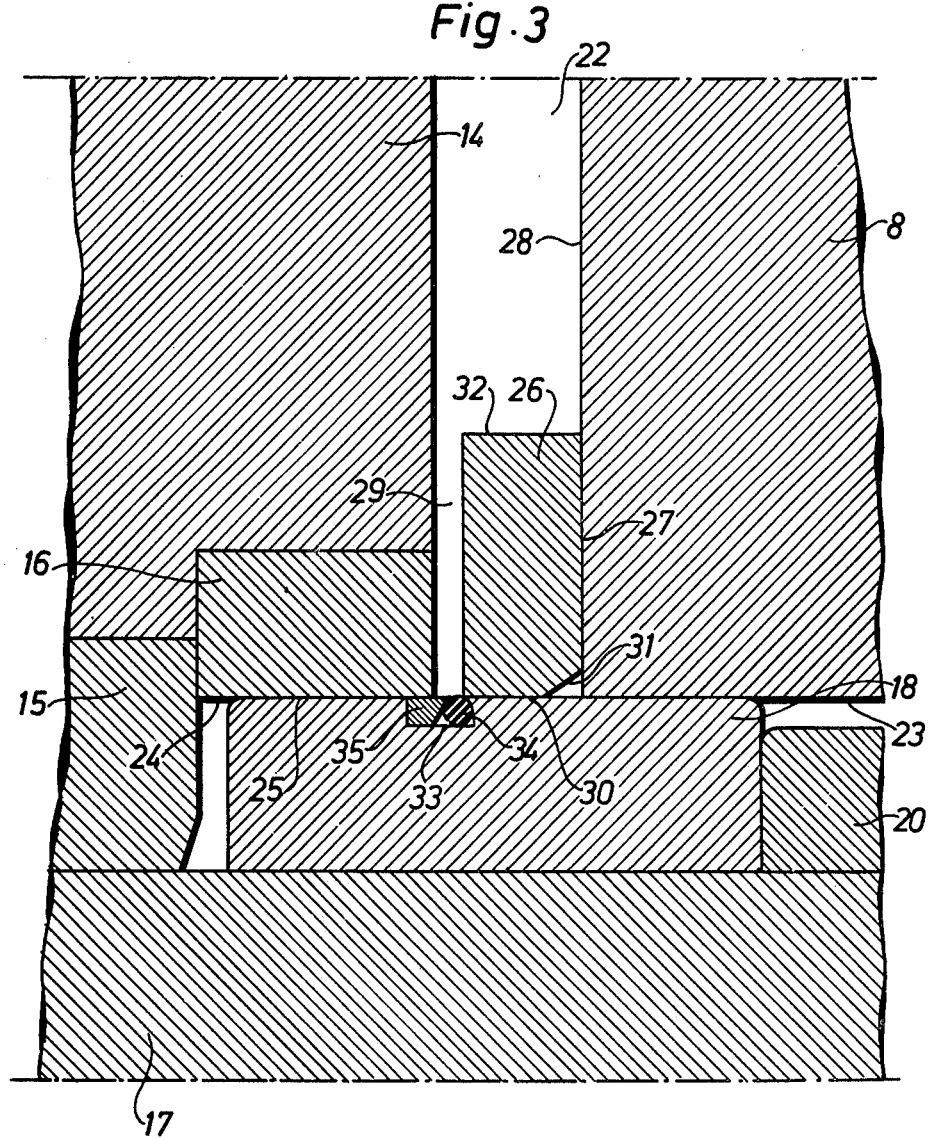
FIG. 3 shows on a still larger scale the die support and the seal at the die end of the pressure chamber.
Figure 4:
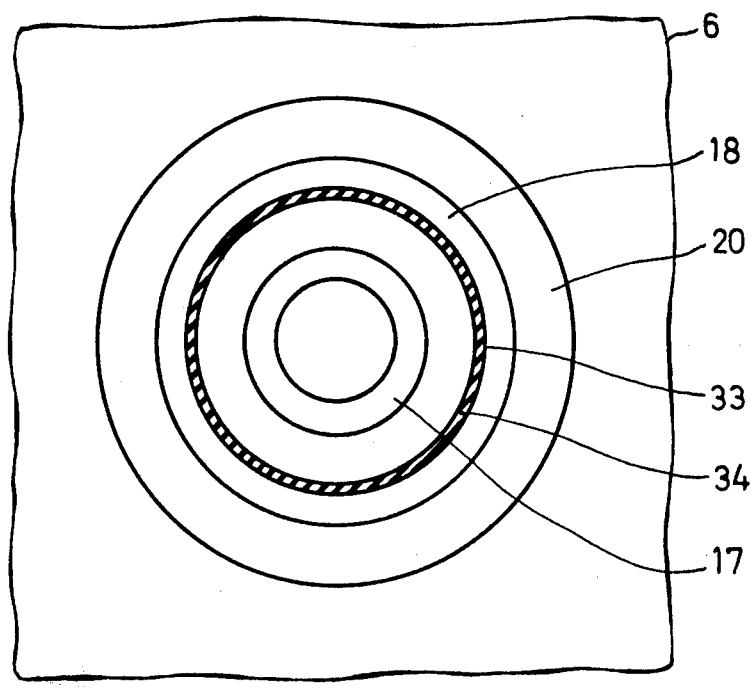
FIG. 4 is a plan view.

In the figures, 1 designates a press chamber which is formed of a high pressure cylinder 2, a pressure generating piston 3, a die 4 and a die support 5 resting against a yoke 6 in a press, the rest of which is not shown. The high pressure cylinder 2 comprises a cylinder 7, which may be built up in a manner known per se of a tube and prestressed wires or strips wound around said tube, and a liner 8 inserted in the cylinder 7. Between the plunger 3 and the liner 8 there is a seal consisting of two metal rings 10 and 11 and an O-ring 12. The end piece 13 of the cylinder 2 also forms a support for the seal. The die 4 consists of a preforming part 14, an end forming and calibrating part 15 and of a suitably prestressed ring 16 holding said two parts together. The die support 5 comprises a strong annular part 17, an exchangeable support ring 18 and an attachment ring 20 arranged around said support ring 18 in a prestressed manner, said ring 20 being joined to the part 17 by a number of bolts 21.

The ring 18 of the die support bridges the gap 22 between the parts 14 and 16 of the die. The ring 18 is pressed against the end surface 23 of the liner 8. The end surface 24 of the die ring 16 seals against the upper surface 25 of the ring 18. As opposed to previously used rings, there is only one single metallic sealing ring 26 in the gap 22, the outer surface 27 of said ring 26 sealing against the inner surface 28 of the liner, since in unloaded condition the ring has a larger diameter than the liner and is prestressed when it is inserted. Between the sealing ring 26 and the die there is a gap 29 completely free of the sealing members used heretofore. The plane end surface 30 of the sealing 26 makes contact with the upper surface 25 of the support ring 18 of the die. At one corner the sealing ring is make with a bevel 31. The ring-shaped space formed by the beveling should be ventilated towards the atmosphere. The pressure acting on the end surface 32 above the bevel will be distributed along the plane end surface 30 of the ring, by which means the contact pressure between surfaces 30 and 25 will exceed the fluid pressure inside the high pressure chamber 1, thus obtaining good sealing. In the ring 18 there is an annular groove 33, in which there is a sealing ring 34 which provides initial sealing between the ring 18 and the ring 26. The sealing ring can be fixed in the groove by a locking ring 35 with an oblique outer side surface. The sealing ring may be a so-called O-ring, but another shape which also provides initial sealing between the die ring 16 and the support ring 18 may be used as well.

I claim:

1. Press for hydrostatic extrusion having a press chamber to enclose a pressure medium, which press chamber is formed of a high pressure cylinder, a pressure generating piston, a die and a die support and seals, in which there is a metallic sealing ring in the high pressure cylinder, the outer cylindrical surface of said metallic sealing ring making contact with the cylinder and one end surface of said sealing ring making contact with the die support, the die support having a groove in the end surface, said groove being concentric with the sealing ring and having an outer diameter of at least the same size as the inner diameter of said metallic sealing ring making contact with the die support outside the groove when the container is closed, and a sealing ring in said groove abutting the inner edge of the metallic sealing ring at the end in contact with the die support.

2. Press according to claim 1, in which the sealing member consists essentially of elastomeric material.

3. Press according to claim 1, in which a locking ring with a smaller diameter at the bottom of the groove than at the upper part of the groove secures the sealing member in the groove.

* * * * *